United States Patent
Tsuneki et al.

(10) Patent No.: US 11,243,501 B2
(45) Date of Patent: Feb. 8, 2022

(54) MACHINE LEARNING DEVICE, CONTROL SYSTEM, AND MACHINE LEARNING

(71) Applicant: FANUC CORPORATION, Yamanashi (JP)

(72) Inventors: Ryoutarou Tsuneki, Yamanashi (JP); Satoshi Ikai, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 11 days.

(21) Appl. No.: 16/807,804

(22) Filed: Mar. 3, 2020

(65) Prior Publication Data
US 2020/0301376 A1 Sep. 24, 2020

(30) Foreign Application Priority Data
Mar. 22, 2019 (JP) .............................. JP2019-054837

(51) Int. Cl.
*G05B 13/02* (2006.01)
*G05B 19/19* (2006.01)
*G05B 19/416* (2006.01)

(52) U.S. Cl.
CPC ......... *G05B 13/0265* (2013.01); *G05B 19/19* (2013.01); *G05B 19/416* (2013.01); *G05B 2219/34013* (2013.01)

(58) Field of Classification Search
CPC .. G05B 13/0265; G05B 19/19; G05B 19/416; G05B 2219/34013
See application file for complete search history.

(56) References Cited

U.S. PATENT DOCUMENTS

| | | | |
|---|---|---|---|
| 2012/0296471 A1* | 11/2012 | Inaba | ................... B25J 9/163 700/253 |
| 2018/0222048 A1* | 8/2018 | Hasegawa | .............. B25J 9/1697 |
| 2018/0225113 A1* | 8/2018 | Hasegawa | ................ B25J 9/161 |

(Continued)

FOREIGN PATENT DOCUMENTS

| | | |
|---|---|---|
| JP | 2-85902 | 3/1990 |
| JP | 4-84303 | 3/1992 |
| JP | 5-19858 | 1/1993 |

(Continued)

OTHER PUBLICATIONS

Notification of Reasons for Refusal dated Apr. 20, 2021 in JP Patent Application No. 2019-054837.

*Primary Examiner* — Ronald D Hartman, Jr.
(74) *Attorney, Agent, or Firm* — Wenderoth, Lind & Ponack, L.L.P.

(57) ABSTRACT

Vibration of a machine end and an error of a moving trajectory are suppressed. A machine learning device performs machine learning of optimizing first coefficients of a filter provided in a motor controller that controls a motor and second coefficients of a velocity feedforward unit of a servo control unit provided in the motor controller on the basis of an evaluation function which is a function of measurement information after acceleration and deceleration by an external measuring instrument provided outside the motor controller, a position command input to the motor controller, and a position error which is a difference between the position command value and feedback position detection value from a detector of the servo control unit.

10 Claims, 10 Drawing Sheets

(56) References Cited

U.S. PATENT DOCUMENTS

2018/0229364 A1* 8/2018 Wang ................... B25J 9/1694
2019/0227502 A1* 7/2019 Nakamura ............ G06N 20/00

FOREIGN PATENT DOCUMENTS

| JP | 2009-104439 | | 5/2009 |
| JP | 2009-110492 | A | 5/2009 |
| WO | 2015/111298 | A1 | 7/2015 |
| WO | 2018/151215 | A1 | 8/2018 |

* cited by examiner

MACHINE LEARNING DEVICE, CONTROL SYSTEM, AND MACHINE LEARNING

This application is based on and claims the benefit of priority from Japanese Patent Application No. 2019-054837, filed on 22 Mar. 2019, the content of which is incorporated herein by reference.

BACKGROUND OF THE INVENTION

Field of the Invention

The present invention relates to a machine learning device that performs machine learning of optimizing coefficients of a filter and a velocity feedforward unit provided in a motor controller that controls rotation of a motor of a machine tool, a robot, or an industrial machine and relates to a control system including the machine learning device and a machine learning method.

Related Art

A device that automatically adjusts characteristics of a filter is disclosed in Patent Document 1 and Patent Document 2, for example. Patent Document 1 discloses a servo actuator which superimposes an AC signal obtained by sweeping frequencies on a velocity command value signal during a tuning mode, detects an amplitude of a torque command value signal obtained from a velocity control unit as a result of the superimposition, and sets the frequency of the torque command value signal when the rate of change in the amplitude changes from positive to negative as a center frequency of a notch filter.

Patent Document 2 discloses a servo actuator which includes a velocity feedback loop that controls the velocity of a motor and in which a notch filter means is inserted in the velocity feedback loop to remove mechanical resonance, the servo actuator including: a data collection means that acquires data indicating frequency response characteristics of the velocity feedback loop; a moving average means that calculates a moving average of the data acquired by the data collection means; a comparing means that compares the data obtained by the moving average means with the data obtained by the data collection means to extract the resonance characteristics of the velocity feedback loop; and a notch filter setting means that sets the frequency and the Q-value of the notch filter means on the basis of the resonance characteristics extracted by the comparing means.

A servo controller which uses feedforward control is disclosed in Patent Document 3 and Patent Document 4, for example. Patent Document 3 discloses a neural network that calculates a feedforward term of a velocity command from a position command value and adds the feedforward term to a velocity command output from a position control unit and a neural network that calculates a feedforward term of a torque command from a velocity command value and adds the feedforward term to a torque command output from a velocity control unit. The neural networks learn a variation in the moment of inertia of a driving system and resonance characteristics and the like of the driving system to calculate an optimal feedforward term.

Patent Document 4 discloses a position feedforward calculation unit that calculates a feedforward term of a velocity command from a position command value and adds the feedforward term to a velocity command output from a position control device and a velocity feedforward calculation unit that calculates a feedforward term of a torque command from a position command value and adds the feedforward term to a torque command output from a velocity control device. Moreover, Patent Document 4 discloses a learning control device that learns a gain of the position feedforward calculation unit on the basis of a position error which is a difference between the position command value and the feedback position detection value and a learning control device that learns a gain of the velocity feedforward calculation unit on the basis of the position error or a velocity error which is a difference between the velocity command value and the feedback velocity detection value.

Patent Document 1: Japanese Unexamined Patent Application, Publication No. H5-19858
Patent Document 2: Japanese Unexamined Patent Application, Publication No. 2009-104439
Patent Document 3: Japanese Unexamined Patent Application, Publication No. H4-084303
Patent Document 4: Japanese Unexamined Patent Application, Publication No. H2-085902

SUMMARY OF THE INVENTION

When the characteristics of filters such as notch filter are determined, it is necessary to determine a plurality of coefficients (parameters) such as attenuation coefficients of a transfer function of the filter and a central frequency and a bandwidth of a band to be removed. Moreover, although a position error may occur when the rotation velocity is changed by the servo controller, in such a case, it is necessary to determine the coefficients (parameters) of a transfer function of a velocity feedforward unit. It is not easy to optimize both the coefficients of the transfer function of the filter and the coefficients of the transfer function of the velocity feedforward unit.

(1) An aspect of the present disclosure is a machine learning device that performs machine learning of optimizing first coefficients of a filter provided in a motor controller that controls a motor and second coefficients of a velocity feedforward unit of a servo control unit provided in the motor controller on the basis of an evaluation function which is a function of measurement information after acceleration and deceleration by an external measuring instrument provided outside the motor controller, a position command input to the motor controller, and a position error which is a difference between the position command value and feedback position detection value from a detector of the servo control unit.

(2) Another aspect of the present disclosure is a control system including: the machine learning device according to, a motor, a servo control unit that includes a velocity feedforward unit, and a motor controller that includes a filter and controls the motor; and an external measuring instrument provided outside the motor controller.

(3) Still another aspect of the present disclosure is a machine learning method of a machine learning device, including: acquiring first coefficients of a filter provided in a motor controller that controls a motor, second coefficients of a velocity feedforward unit, measurement information after acceleration and deceleration by an external measuring instrument provided outside the motor controller, a position command input to the motor controller, and a position error which is a difference between the position command value and feedback position detection value; and performing machine learning of optimizing the first coefficients and the second coefficients on the basis of an evaluation function which is a function of the measurement information, the position command, and the position error.

According to the respective aspects of the present disclosure, it is possible to suppress vibration of a machine end and an error of a moving trajectory by machine-learning the first coefficients that determine the characteristics of the filter and the second coefficients of the velocity feedforward unit. Moreover, since the external measuring instrument is disposed outside the motor controller, it is possible to remove the external measuring instrument after machine learning is performed and to reduce the cost and improve reliability.

DETAILED DESCRIPTION OF THE INVENTION

Hereinafter, an embodiment of the present disclosure will be described in detail with reference to the drawings.

Figure 1:
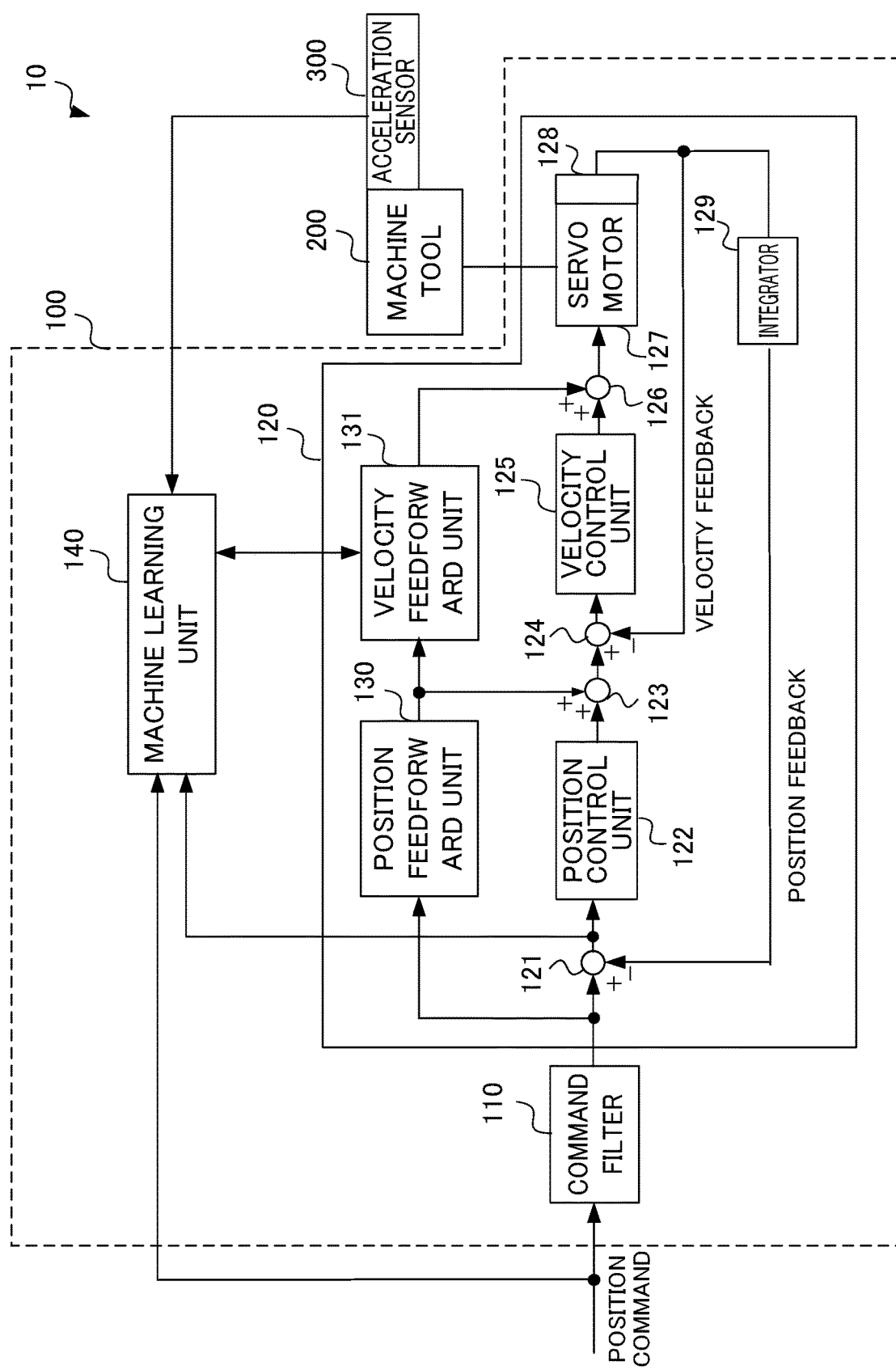
FIG. 1 is a block diagram illustrating a control system including a motor controller according to an embodiment of the present disclosure, a machine tool, and an acceleration sensor.

FIG. 1 is a block diagram illustrating a motor controller according to an embodiment of the present disclosure, a machine tool, and a control system including an acceleration sensor. As illustrated in FIG. 1, a control system 10 includes a motor controller 100, a machine tool 200 controlled by the motor controller 100, and an acceleration sensor 300 attached to the machine tool 200. The acceleration sensor 300 is an external measuring instrument provided outside the motor controller 100, and an acceleration measured is measurement information. Although a machine tool is adopted and described as a control target of the motor controller 100, the control target is not limited to a machine tool but may be a robot, an industrial machine, or the like, for example. The motor controller 100 may be provided as a part of a control target such as a machine tool, a robot, or an industrial machine.

The motor controller 100 includes a command filter 110, a servo control unit 120, and a machine learning unit 140. The machine learning unit 140 may be provided outside the motor controller 100. As the command filter 110, a notch filter, a filter that sets an acceleration or deceleration time constant, or an inverse characteristic filter, for example, is used. A position command is input to the command filter 110, and the command filter 110 serves as a position command value shaper that performs shaping of the input position command. The position command is generated such that a pulse frequency for changing the velocity of a servo motor 127 is changed by a host controller, an external input device, etc. according to a predetermined machining program. The position command serves as a control command. The position command is input to the command filter 110 and the machine learning unit 140. Although the command filter 110 is provided outside the servo control unit 120 (that is, outside a position feedback loop and a velocity feedback loop to be described later), the command filter 110 may be provided in a position feedback loop or a velocity feedback loop of the servo control unit 120. For example, the command filter 110 may be connected to an output side of a velocity control unit 125 (to be described later) or an output side of an adder 123 of the servo control unit 120. However, in order to suppress vibration outside a control loop (a position feedback loop or a velocity feedback loop) of the servo control unit 120, the command filter 110 is preferably provided outside the position feedback loop or the velocity feedback loop. In FIG. 1, the command filter 110 is disposed before a subtractor 121 (to be described later) that calculates a position error, and the output of the command filter 110 is output to the subtractor 121 and a position feedforward unit 130 (to be described later). Although a configuration of the command filter 110 is not particularly limited, the command filter 110 is preferably an IIR filter (infinite impulse response filter) of the second order or higher.

Mathematical Expression 1 (indicated as Math. 1 below) indicates a transfer function F(ρ,s) of a notch filter as the command filter 110. The parameter ρ indicates coefficients ω, ζ, and R. The coefficients ω, ζ, and R serve as first parameters. The coefficient R in Mathematical Expression 1 is an attenuation coefficient, the coefficient ω is a central angular frequency, and the coefficient ζ is a specific bandwidth. When the central frequency is fc and the bandwidth is fw, the coefficient ω is represented as ω=2πfc, and the coefficient ζ is represented as ζ=fw/fc.

$$F(\rho, s) = \frac{s^2 + 2\zeta R\omega s + \omega^2}{s^2 + 2\zeta\omega s + \omega^2} \qquad [\text{Math. 1}]$$

The servo control unit 120 includes a subtractor 121, a position control unit 122, an adder 123, a subtractor 124, a velocity control unit 125, an adder 126, a servo motor 127, an integrator 129, a position feedforward unit 130, and a velocity feedforward unit 131. The subtractor 121, the position control unit 122, the adder 123, the subtractor 124, the velocity control unit 125, the adder 126, the servo motor 127, and the integrator 129 form a position feedback loop. In addition, the subtractor 124, the velocity control unit 125, the adder 126, and the servo motor 127 form a velocity feedback loop. A rotary encoder 128 is attached to the servo motor 127 serving as a motor. The rotary encoder 128 and the Integrator 129 are detectors, and the integrator 129 outputs the position detection value to the subtractor 121 as feedback position detection value. In the following description, although the servo motor 127 is described as a motor that performs rotary motion, the servo motor 127 may be a linear motor that performs linear motion.

The subtractor 121 calculates a difference between a position command after shaping output from the command filter 110 and a feedback detection position and outputs the difference to the position control unit 122 and the machine learning unit 140 as a position error.

The position control unit 122 outputs a value obtained by multiplying the position error by a position gain Kp to the adder 123 as a velocity command value.

The adder 123 adds the velocity command value and an output value (a position feedforward term) of the position feedforward unit 130 and outputs an addition result to the subtractor 124 as a feedforward-controlled velocity command value. The subtractor 124 calculates a difference between the output of the adder 123 and the feedback velocity detection value and outputs the difference to the velocity control unit 125 as a velocity error.

The velocity control unit 125 adds a value obtained by multiplying and integrating the velocity error by an integral gain K1v and a value obtained by multiplying the velocity error by a proportional gain K2v and outputs an addition result to the adder 126 as a torque command value. The adder 126 adds the torque command value and an output value (a velocity feedforward term) of the velocity feedforward unit 131 and outputs an addition result to the servo motor 127 as a feedforward-controlled torque command value. The integrator 129 outputs the position detection value by integrating the velocity detection value output from the rotary encoder 128.

A rotational angular position of the servo motor 127 is detected by the rotary encoder 128, and a velocity detection value is input to the subtractor 124 as velocity feedback information (velocity FB information). The velocity detection value is integrated by the integrator 129 to be a position detection value, and the position detection value is input to the subtractor 121 as feedback position detection value (position FB information).

The position feedforward unit 130 performs a position feedforward process represented by a transfer function G(s) indicated by Mathematical Expression 2 (indicated as Math. 2 below) with respect to a value obtained by differentiating the position command value output from the command filter 110 and multiplying the same by a constant and outputs a processing result thereof to the adder 123 as a position feedforward term. The coefficients $a_i$ and $b_j$ (m, n≥i, j≥0, and m and n are natural numbers) in Expression 2 are the coefficients of the transfer function G(s).

$$G(s) = \frac{b_0 + b_1 s + b_2 s^2 + \cdots + b_n s^n}{a_0 + a_1 s + a_2 s^2 + \cdots + a_m s^m}$$ [Math. 2]

The velocity feedforward unit 131 performs a velocity feedforward process represented by a transfer function H(s) indicated by Expression 3 (indicated as Math. 3 below) with respect to a value obtained by double-differentiating a position command value and multiplying the same by a constant and outputs the processing result to the adder 126 as a velocity feedforward term. The coefficients $c_i$ and $d_j$ (m, n≥i, j≥0, and m and n are natural numbers) in Expression 3 are the coefficients of the transfer function H(s). The coefficients $c_i$ and $d_j$ serve as second parameters. The natural numbers m and n may be the same numbers the natural numbers as m and n in Expression 2 or other numbers.

$$H(s) = \frac{d + d_1 s + d_2 s^2 + \cdots + d_n s^n}{c_0 + c_1 s + c_2 s^2 + \cdots + c_m s^m}$$ [Math. 3]

The servo control unit 120 is configured in this manner.

Figure 2:
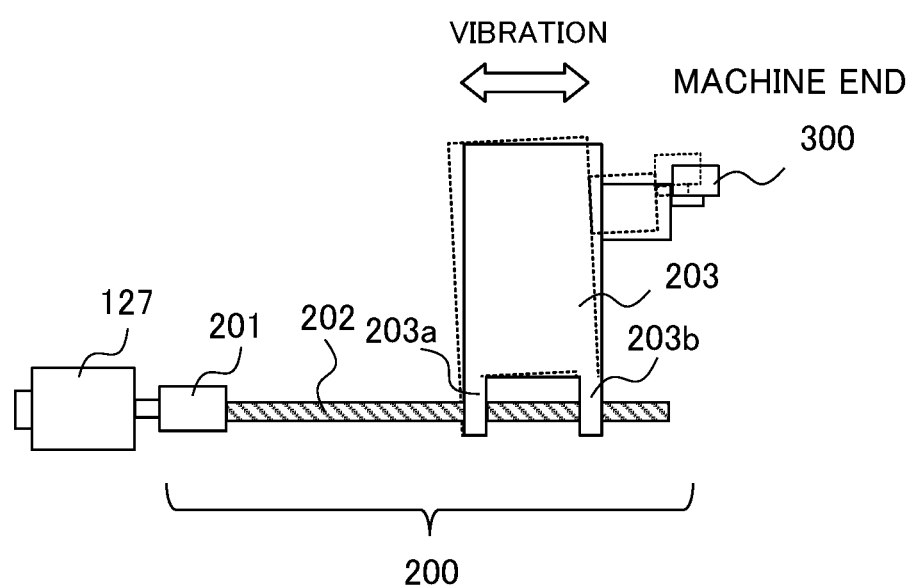
FIG. 2 is a diagram illustrating a configuration of a motor, a part of a machine tool, and an acceleration sensor.

Next, prior to description of the machine learning unit 140, the machine tool 200 and the acceleration sensor 300 attached to the machine tool 200 will be described. FIG. 2 is a diagram illustrating a configuration of a motor, a part of a machine tool, and an acceleration sensor. The machine tool 200 includes a machine body 203 including a coupling (an axis coupling) 201, a ball screw 202, and two nuts 203a and 203b threaded to the ball screw 202, connected to a rotation axis of the servo motor 127. With rotation of the servo motor 127, the two nuts 203a and 203b threaded to the ball screw 202 move in an axial direction of the ball screw 202 whereby the machine body 203 moves.

In the machine tool 200, when the machine body 203 includes a table having a workpiece mounted thereon and the machine body 203 is moved in an X-axis direction and a Y-axis direction, the motor controller 100 illustrated in FIG. 1 is provided in the X-axis direction and the Y-axis direction, respectively. When the machine body 203 is moved in the directions of three or more axes, the motor controller 100 is provided in the respective axial directions.

The acceleration sensor 300 is provided outside the servo control unit 120, and in this example, is attached to a machine end of the machine body 203. The acceleration sensor 300 is preferably attached to a machine end near a machining point. The acceleration sensor 300 serves as an external measuring instrument. Mono-axial, bi-axial, and tri-axial acceleration sensors are known as an acceleration sensor, and these acceleration sensors can be selected as necessary. For example, a bi-axial acceleration sensor is used when the machine body 203 is moved in the X-axis direction and the Y-axis direction, and a tri-axial acceleration sensor is used when the machine body 203 is moved in the X-axis direction, the Y-axis direction, and the Z-axis direction. The acceleration sensor 300 is preferably provided in a place near a machining point. The acceleration sensor 300 measures an acceleration of the machine body 203 and outputs the measured acceleration to the machine learning unit 140. When the acceleration sensor 300 is used during machine learning only, machine learning may be performed before shipping to adjust the coefficients of the command filter 110 and the acceleration sensor 300 may be detached from the machine body 203 after the coefficients of the command filter 110 are adjusted. When relearning is performed after shipping, the acceleration sensor 300 may be detached after relearning is performed. Although the acceleration output from the acceleration sensor 300 may be used for feedback control of the servo control unit 120, the acceleration sensor 300 can be detached unless the acceleration is used for feedback control. In this case, it is possible to reduce the cost of the machine tool 200 and improve reliability.

<Machine Learning Unit 140>

The machine learning unit 140 executes a predetermined machining program (hereinafter also referred to as a "learning machining program") and performs machine learning (hereinafter referred to as learning) on the coefficients ω, ζ, and R of the transfer function of the command filter 110 and the coefficients $c_i$ and $d_j$ of the transfer function of the velocity feedforward unit 131 using the position command, the position error, and the acceleration measurement value from the acceleration sensor 300. The machine learning unit 140 serves as a machine learning device. Although the learning of the machine learning unit 140 is performed before shipping, relearning may be performed after shipping. Here, the motor controller 100 drives the servo motor 127 with the aid of the learning machining program and moves the machine body 203 in a state in which a workpiece is not mounted. A moving trajectory of an arbitrary point of the machine body 203 moved in the X-axis direction and the Y-axis direction is a circle, a rectangle, an octagon, or a shape in which the corners of an octagon are alternately replaced with arcs. FIGS. 3 to 6 are diagrams for describing an operation of a motor when a moving trajectory of a machine body is a circle, a rectangle, an octagon, or a shape in which the corners of an octagon are alternately replaced with arcs. In FIGS. 3 to 6, it is assumed that the machine body 203 moves in a clockwise direction in the X-axis direction and the Y-axis direction.

Figure 3:
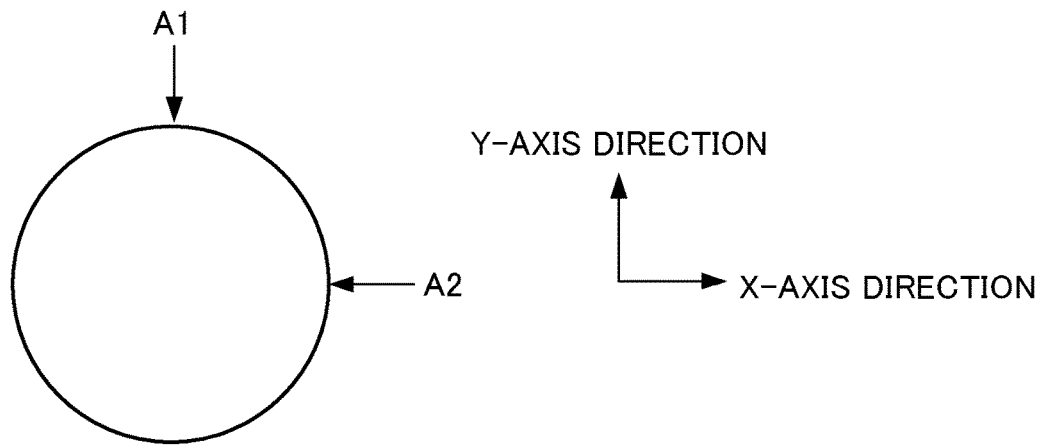
FIG. 3 is a diagram for describing an operation of a motor when a moving trajectory of a machine body is a circle.

When the moving trajectory of the machine body 203 is a circle illustrated in FIG. 3, the rotation velocity of the servo motor that moves the machine body 203 in the Y-axis direction gradually decreases at the position A1 illustrated in FIG. 3 as it approaches the position A1 and gradually increases after passing through the position A1 with the rotation direction reversed at the position A1. The machine body 203 moves to be linearly reversed in the Y-axis direction with the position A1 interposed therebetween. On the other hand, at the position A1, the servo motor that moves the machine body 203 in the X-axis direction rotates at the same velocity as the velocity before and after the position A1, and the machine body 203 moves at the same velocity as the velocity before and after the position A1 in the X-axis direction. At the position A2 illustrated in FIG. 3, the respective servo motors are controlled so that the operation of the servo motor that moves the machine body 203 in the X-axis direction and the operation of the servo motor that moves the machine body 203 in the Y-axis direction are reversed.

Figure 4:
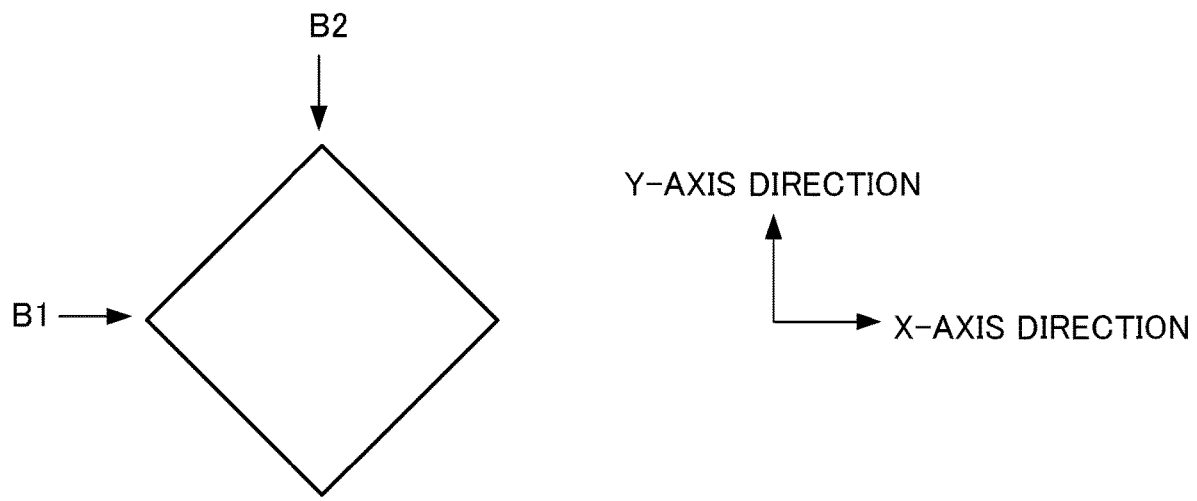
FIG. 4 is a diagram for describing an operation of a motor when a moving trajectory of a machine body is a rectangle.

When the moving trajectory of the machine body 203 is a rectangle illustrated in FIG. 4, the rotation velocity of the servo motor that moves the machine body 203 in the X-axis direction is reversed abruptly at the position B1 illustrated in FIG. 4, and the machine body 203 moves to be abruptly linearly reversed in the X-axis direction with the position B1 interposed therebetween. On the other hand, at the position B1, the servo motor that moves the machine body 203 in the Y-axis direction rotates at the same velocity as the velocity before and after the position B1, and the machine body 203 moves at the same velocity as the velocity before and after the position B1 in the Y-axis direction. At the position B2 illustrated in FIG. 4, the respective servo motors are controlled so that the operation of the servo motor that moves the machine body 203 in the X-axis direction and the operation of the servo motor that moves the machine body 203 in the Y-axis direction are reversed.

Figure 5:
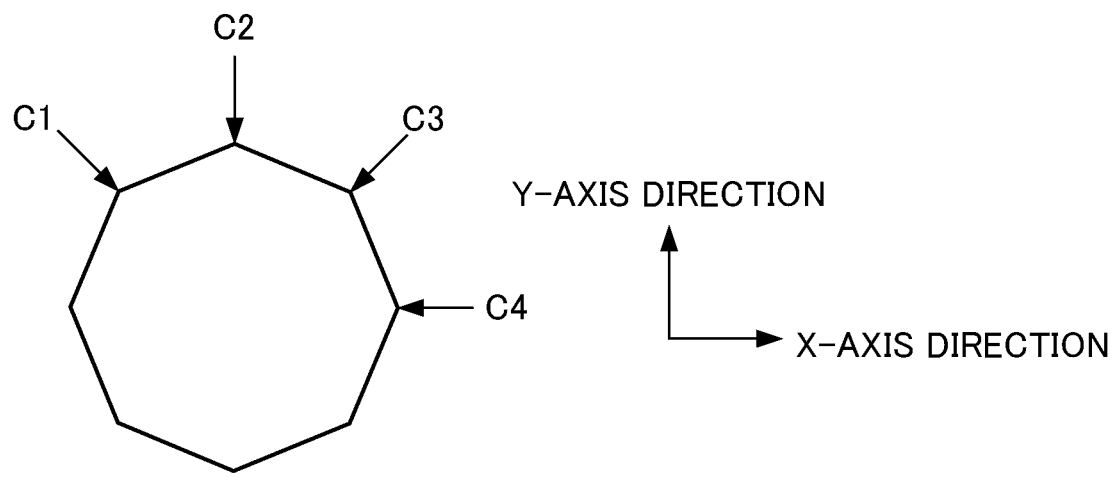
FIG. 5 is a diagram for describing an operation of a motor when a moving trajectory of a machine body is an octagon.

When the moving trajectory of the machine body 203 is an octagon illustrated in FIG. 5, as illustrated in FIG. 5, the rotation velocity of the motor that moves the machine body in the Y-axis direction decreases at the corner position C1, and the rotation velocity of the motor that moves the machine body 203 in the X-axis direction increases. At the corner position C2, the rotation direction of the motor that moves the machine body 203 in the Y-axis direction is reversed, and the machine body 203 moves to be linearly reversed in the Y-axis direction. Moreover, the motor that moves the machine body 203 in the X-axis direction rotates at a constant velocity in the same rotation direction from the position C1 to the position C2 and from the position C2 to the position C3. At the corner position C3, the rotation velocity of the motor that moves the machine body 203 in the Y-axis direction increases, and the rotation velocity of the motor that moves the machine body 203 in the X-axis direction decreases. At the corner position C4, the rotation direction of the motor that moves the machine body 203 in the X-axis direction is reversed and the machine body 203 moves to be linearly reversed in the X-axis direction. Moreover, the motor that moves the machine body 203 in the Y-axis direction rotates at a constant velocity in the same rotation direction from the position C3 to the position C4 and from the position C4 to the next corner position.

Figure 6:
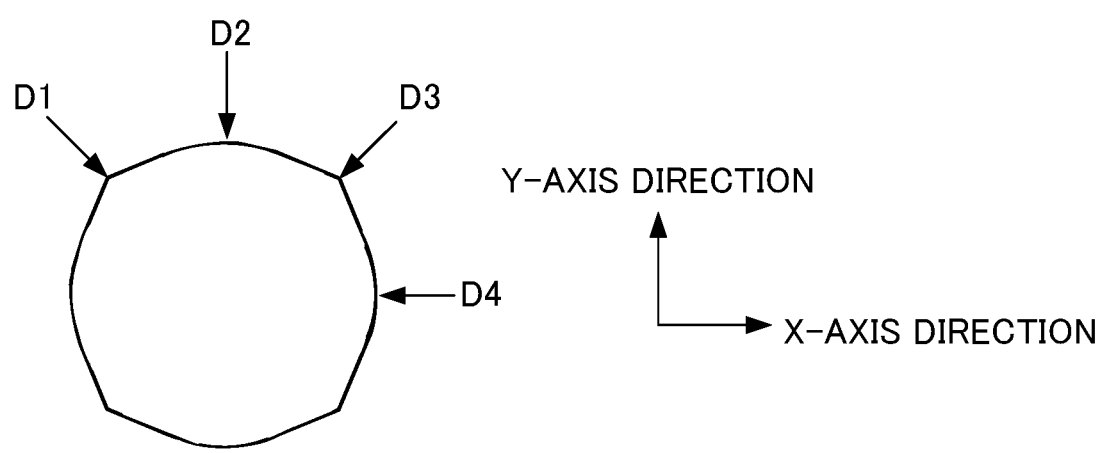
FIG. 6 is a diagram for describing an operation of a motor when a moving trajectory of a machine body is a shape in which the corners of an octagon are alternately replaced with arcs.

When the moving trajectory of the machine body 203 is a shape in which the corners of the octagon are alternately replaced with arcs, as illustrated in FIG. 6, at the corner position D1, the rotation velocity of the motor that moves the machine body 203 in the Y-axis direction decreases and the rotation velocity of the motor that moves the machine body 203 in the X-axis direction increases. At the position D2 of the arc, the rotation direction of the motor that moves the machine body 203 in the Y-axis direction is reversed and the machine body 203 moves to be linearly reversed in the Y-axis direction. Moreover, the motor that moves the machine body 203 in the X-axis direction rotates at a constant velocity in the same rotation direction from the position D1 to the position D3. Unlike the case in which the moving trajectory illustrated in FIG. 5 is an octagon, the rotation velocity of the motor that moves the machine body 203 in the Y-axis direction gradually decreases as it advances toward the position D2 so that a moving trajectory of a circular arc is formed before and after the position D2 and the rotation velocity gradually increases after passing through the position D2 with the rotation stopped at the position D2. At the corner position D3, the rotation velocity of the motor that moves the machine body 203 in the Y-axis direction increases, and the rotation velocity of the motor that moves the machine body 203 in the X-axis direction decreases. At the position D4 of the arc, the rotation direction of the motor that moves the machine body 203 in the X-axis direction is reversed and the machine body 203 moves to be linearly reversed in the X-axis direction. Moreover, the motor that moves the machine body 203 in the Y-axis direction rotates at a constant velocity in the same rotation direction from the position D3 to the position D4 and from the position D4 to the next corner position. The rotation velocity of the motor that moves the machine body 203 in the X-axis direction gradually decreases as it advances toward the position D4 so that a moving trajectory of a circular arc is formed before and after the position D4 and the rotation velocity gradually increases after passing through the position D4 with the rotation stopped at the position D4.

In the present embodiment, vibration generated when the rotation direction of the X-axis direction or the Y-axis direction is reversed at the positions A1 and A2, the positions B1 and B2, the positions C2 and C4, and the positions D2 and D4 of the moving trajectory designated by the learning machining program can be measured using the acceleration sensor 300. Moreover, vibration generated when the rotation velocity is changed during linear control in which the rotation direction is not reversed at the positions C1 and C3 and the positions D1 and D3 can be measured using the acceleration sensor 300. As a result, it is possible to perform machine learning of the coefficients of the command filter 110 so that vibration is suppressed. Furthermore, in the present embodiment, it is possible to learn the coefficients the velocity feedforward unit 131 so that a trajectory error decreases by examining the influence on a position error when the rotation velocity is changed during linear control wherein the rotation direction is not reversed at the positions C1 and C3 and the positions D1 and D3.

Hereinafter, the machine learning unit 140 will be described in further detail. In the following description, although a case in which the machine learning unit 140 performs reinforcement learning is described, the learning performed by the machine learning unit 140 is not particularly limited to reinforcement learning, but the present invention can be also applied to a case in which the machine learning unit 140 performs supervised learning, for example.

Prior to description of respective functional blocks included in the machine learning unit 140, first, a basic mechanism of reinforcement learning will be described. An agent (corresponding to the machine learning unit 140 in the present embodiment) observes an environment state and selects a certain action. Then, the environment changes on the basis of the action. A certain reward is given according to the environmental change, and the agent learns selection (decision) for a better action. While supervised learning presents a complete correct answer, the reward in the reinforcement learning often presents a fragmental value based on change in a portion of the environment. Therefore, the agent learns to select an action so that the total of rewards obtained in the future is maximized.

In this way, the reinforcement learning learns a method of learning a suitable action on the basis of the mutual effect of an action on the environment (that is, an action for maximizing the reward to be obtained in the future) by learning an action. This represents that, in the present embodiment, such an action that affects the future, for example, an action of selecting action information for suppressing vibration of a machine end, is obtained.

Here, although any learning method may be used as the reinforcement learning, in the description below, Q-learning which is a method of learning a value function $Q(S,A)$ of selecting an action A under a certain state S of the environment will be described as an example. An object of the Q-learning is to select an action A having the highest value function $Q(S,A)$ as an optimal action among actions A that can be taken in a certain state S.

However, at an initial time at which the Q-learning starts, the correct value of the value $Q(S,A)$ is not known at all for a combination of the state S and the action A. Therefore, the agent learns the correct value $Q(S,A)$ by selecting various actions A under a certain state S and making a better selection of action based on rewards given for the selected actions A.

Moreover, since the agent wants to maximize the total of rewards obtained over the course of the future, the Q-learning aims to attain a relation of $Q(S,A)=E[\Sigma(\gamma^t)r_t]$ in the end. Here, $E[\ ]$ indicates an expected value, t indicates time, $\gamma$ is a parameter called a discount factor to be described later, $r_t$ is a reward at time t, and $\Sigma$ is the sum at time t. In this expression, the expected value is an expected value when the state was changed according to an optimal action. However, since it is unclear which action would be optimal in the process of Q-learning, reinforcement learning is performed while searching for an optimal action by performing various actions. An updating expression of such a value $Q(S,A)$ can be represented by Expression 4 below (indicated as Math. 4 below).

$$Q(S_{t+1}, A_{t+1}) \leftarrow \quad \text{[Math. 4]}$$
$$Q(S_t, A_t) + \alpha\left(r_{t+1} + \gamma \max_A Q(S_{t+1}, A) - Q(S_t, A_t)\right)$$

In Expression 4, $S_t$ indicates a state of the environment at time t, and $A_t$ indicates an action at time t. By the action $A_t$, the state changes to $S_{t+1}$. $r_{t+1}$ indicates a reward obtained by the change in the state. Moreover, a term with max is a multiplication of the Q value by $\gamma$ when an action A having the highest Q value known at that moment is selected under the state $S_{t+1}$. Here, $\gamma$ is a parameter of $0<\gamma\le1$ and is called a discount rate. Moreover, $\alpha$ is a learning coefficient and is in the range of $0<\alpha\le1$.

Expression 3 indicates a method of updating a value $Q(S_t,A_t)$ of an action $A_t$ in a state $S_t$ based on a reward $r_{t+1}$ that was offered in return when the action $A_t$ was performed. This updating expression indicates that if the value $\max_a Q(S_{t+1},A)$ of the best action in the next state $S_{t+1}$ associated with an action At is larger than the value $Q(S_t,A_t)$ of an action $A_t$ in the state $S_t$, $Q(S_t,A_t)$ is increased, and if otherwise, $Q(S_t,A_t)$ is decreased. That is, the value of a certain action in a certain state approaches the value of the best action in the next state associated with the action. However, although this difference differs depending on the discount rate $\gamma$ and the reward $r_{t+1}$, the value of the best action in a certain state basically propagates to the value of an action in a state previous to that state.

Here, a Q-learning method of creating a value function $Q(S,A)$ table for all state-action pairs $(S,A)$ to perform learning is known. However, it may take a considerably long time for the Q-learning to converge, since the number of states is too large to calculate the $Q(S,A)$ values of all state-action pairs.

Thus, Q-learning may use an existing technique called a Deep Q-Network (DQN). Specifically, with DQN, the value of the value $Q(S,A)$ is calculated by constructing a value function Q using an appropriate neural network and approximating the value function Q with the appropriate neural network by adjusting the parameters of the neural network. By using DQN, it is possible to shorten the time required for convergence of Q-learning. The details of DQN are disclosed in the Non-Patent Document below, for example.
<Non-Patent Document>

"Human-level control through deep reinforcement learning", Volodymyr Mnihl [online], [searched on Jan. 17, 2017], Internet <URL: http://files.davidqiu.com/research/nature14236.pdf>

The machine learning unit 140 performs the above-described Q-learning. Specifically, the machine learning unit 140 learns a value Q of selecting an action A of adjusting the values of the coefficients $\omega$, $\zeta$, and R of the transfer function of the command filter 110 and the coefficients $c_i$ and $d_j$ of the velocity feedforward unit 131 associated with a state S, wherein the state S includes the values of the coefficients $\omega$, $\zeta$, and R of the transfer function of the command filter 110, the coefficients $c_i$ and $d_j$ of the velocity feedforward unit 131, the measured acceleration from the acceleration sensor 300 acquired by executing the learning machining program, the position command, and the position error.

The machine learning unit 140 observes the state information S including the measured acceleration from the acceleration sensor 300, the position command, and the position error by executing one or a plurality of learning machining programs described above on the basis of the coefficients $\omega$, $\zeta$, and R of the transfer function of the command filter 110 and the coefficients $c_i$ and $d_j$ of the transfer function of the velocity feedforward unit 131 to determine the action A. The machine learning unit 140 receives a reward whenever the action A is executed. The machine learning unit 140 searches in trial-and-error manner for the optimal action A so that the total of the reward over the course of the future is maximized. By doing so, the machine learning unit 140 can select an optimal action A (that is, the optimal coefficients ω, ζ, and R of the transfer function of the command filter 110 and the optimal coefficients $c_i$ and $d_j$ of the transfer function of the velocity feedforward unit 131) with respect to the state S including the measured acceleration from the acceleration sensor 300 acquired by executing the learning machining program, the position command, and the position error on the basis of the coefficients ω, ζ, and R of the transfer function of the command filter 110 and the coefficients $c_i$ and $d_j$ of the transfer function of the velocity feedforward unit 131.

That is, the machine learning unit 140 can select such an action A (that is, the coefficients ω, ζ, and R of the transfer function of the command filter 110 and the coefficients $c_i$ and $d_j$ of the transfer function of the velocity feedforward unit 131) that minimizes the vibration of a machine end generated when a learning machining program is executed by selecting such an action A that maximizes the value of Q among the actions A applied to the coefficients ω, ζ, and R of the transfer function of the filter 110 and the coefficients $c_i$ and $d_j$ of the transfer function of the velocity feedforward unit 131 associated with a certain state S on the basis of the value function Q learned by the machine learning unit 140.

Figure 7:
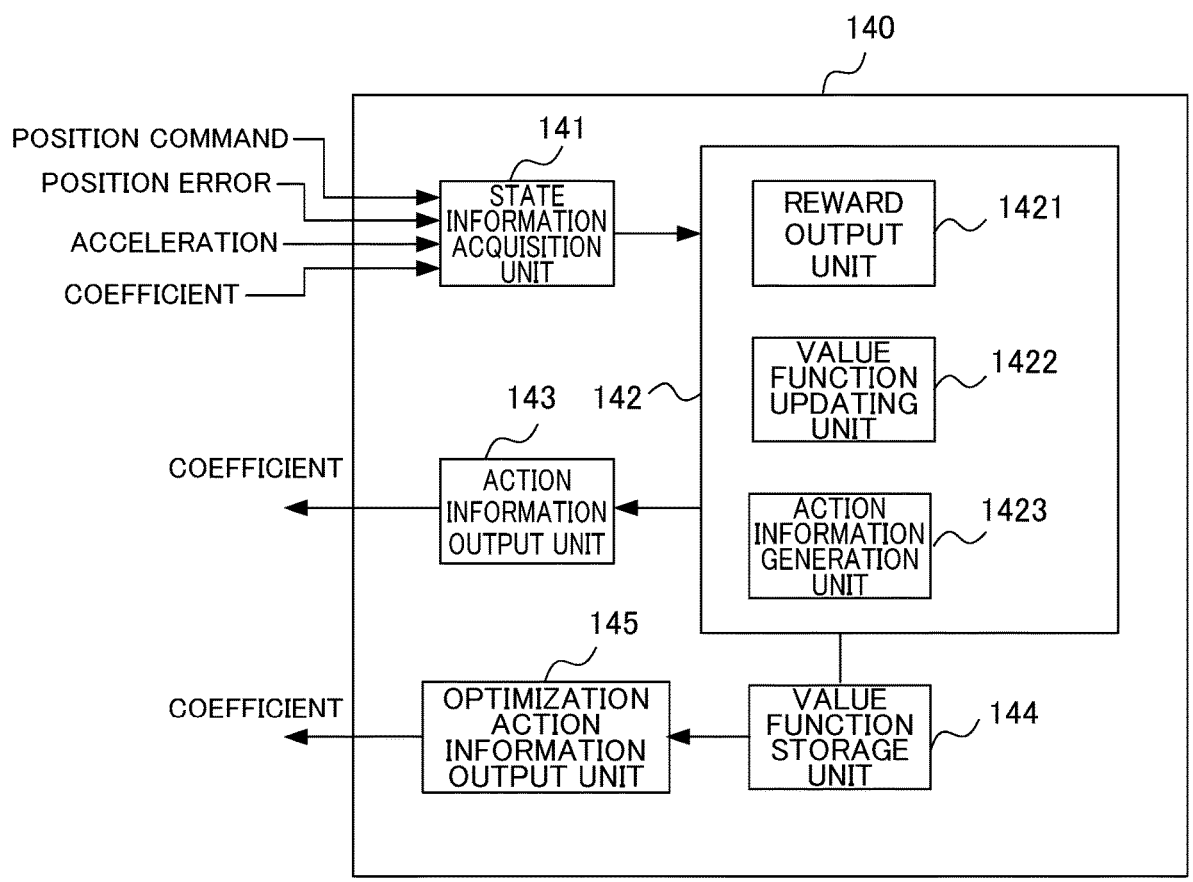
FIG. 7 is a block diagram illustrating a machine learning unit according to an embodiment of the present disclosure.

FIG. 7 is a block diagram illustrating the machine learning unit 140 according to an embodiment of the present disclosure. As illustrated in FIG. 7, in order to perform the reinforcement learning described above, the machine learning unit 140 includes a state information acquisition unit 141, a learning unit 142, an action information output unit 143, a value function storage unit 144, and an optimization action information output unit 145. The learning unit 142 includes a reward output unit 1421, a value function updating unit 1422, and an action information generation unit 1423.

The state information acquisition unit 141 acquires the state S including the measured acceleration from the acceleration sensor 300 acquired by executing the learning machining program, the position command, and the position error on the basis of the coefficients ω, ζ, and R of the transfer function of the command filter 110 and the coefficients $c_i$ and $d_j$ of the transfer function of the velocity feedforward unit 131. The state information S corresponds to a state S of the environment in the Q-learning. The state information acquisition unit 141 outputs the acquired state information S to the learning unit 142.

The coefficients ω, ζ, and R of the transfer function of the command filter 110 and the coefficients $c_i$ and $d_j$ of the transfer function of the velocity feedforward unit 131 at a time point at which the Q-learning starts initially are generated by a user in advance. In the present embodiment, the initial setting values of the coefficients ω, ζ, and R of the transfer function of the command filter 110 and the coefficients $c_i$ and $d_j$ of the transfer function of the velocity feedforward unit 131 calculated by the user are adjusted to optimal values by the reinforcement learning. When a machine tool is adjusted by an operator in advance, machine learning may be performed using the adjusted values of the coefficients ω, ζ, and R and the coefficients $c_i$ and $d_j$ as the initial values.

The learning unit 142 is a unit that learns the value Q(S,A) when a certain action A is selected under a certain environment state S.

The reward output unit 1421 is a unit that calculates a reward when the action A is selected under a certain state S. Here, a measured acceleration which is a state variable of the state S will be denoted by y(S), a position command which is a state variable associated with the state information S will be denoted by r(S), and a position error which is a state variable associated with the state information S will be denoted by e(S). Moreover, a measured acceleration which is a state variable associated with state information S' changed from the state S due to the action information A (compensations of the coefficients ω, ζ, and R of the transfer function of the command filter 110 and the coefficients $c_i$ and $d_j$ of the transfer function of the velocity feedforward unit 131) will be denoted by y(S'), a position command which is a state variable associated with the state information S' will be denoted by r(S'), and a position error which is a state variable associated with the state information S' will be denoted by e(S')

An evaluation function is a function of a measured acceleration, a position command, and a position error, and for example, an evaluation function f(r,y,e) represented by Expression 5 (indicated as Math. 5 below) can be used. Expression 5 indicates that the evaluation function f(r,y,e) is the sum of an integral sum (integration) of a square of an acceleration error (a difference between a double differentiation of the position command r and the measured acceleration y) after acceleration and deceleration and the sum (integration) of a double differentiation of a position error. The measured acceleration y is the measured acceleration after acceleration and deceleration. The coefficients α and β are predetermined constants.

$$f(r, y, e) = \alpha \Sigma \left(\frac{d^2 r}{dt^2} - y\right)^2 + \beta \Sigma \left(\frac{d^2 e}{dt^2}\right)^2 \quad \text{[Math. 5]}$$

Figure 8:
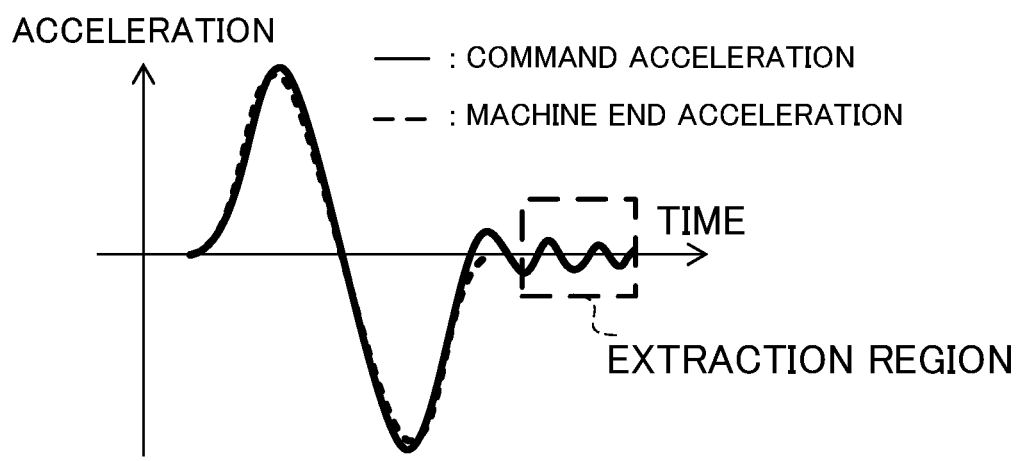
FIG. 8 is a characteristic diagram illustrating a command acceleration and a machine end acceleration.

As illustrated in FIG. 8, the acceleration error after acceleration and deceleration is a value extracted in a region (a region indicated by a dot line in FIG. 8) in which acceleration and deceleration ends and a machine end acceleration is in a settled state. FIG. 8 is a characteristic diagram showing the command acceleration and the mechanical end acceleration. In FIG. 8, a command acceleration indicated by a solid line is obtained by double-differentiating a position command, and a machine end acceleration indicated by a dot line is a measured acceleration of the acceleration sensor 300. Expression 6 and Expression 7 (indicated as Math. 6 and Math. 7 below) illustrated below can be used as the evaluation function f(r,y,e). The coefficients α, β, γ are predetermined constants.

$$\alpha \Sigma \left(\frac{d^2 r}{dt^2} - y\right)^2 + \beta \Sigma \left(\frac{de}{dt}\right)^2 + \gamma \Sigma \left(\frac{d^2 e}{dt^2}\right)^2 \quad \text{[Math. 6]}$$

$$\alpha \Sigma \left(\frac{d^2 r}{dt^2} - y\right)^2 + \beta \Sigma e^2 + \gamma \Sigma \left(\frac{d^2 e}{dt^2}\right)^2 \quad \text{[Math. 7]}$$

Although an integration of a square is performed in each term of Expressions 5 to 8, an absolute value may be integrated or an absolute value may be time (t)-weighted. For example, the first term of Expressions 5 to 8 may use a time integration of an absolute value of an expression ($d^2r/dt^2-y$) and a time integration of time (t)-weighted absolute value of the expression ($d^2r/dt^2-y$).

In this case, if the evaluation function $f(r(S'),y(S'),e(S'))$ when the motor controller 100 was operated on the basis of the command filter 110 after compensation associated with the state information S' corrected by the action information A is larger than the evaluation function $f(r(S),y(S),e(S))$ when the motor controller 100 was operated on the basis of the command filter 110 before compensation associated with the state information S before being corrected by the action information A, the reward output unit 1421 sets a reward value to a negative value.

On the other hand, if the evaluation function $f(r(S'),y(S'),e(S'))$ is smaller than the evaluation function $f(r(S),y(S),e(S))$, the reward output unit 1421 sets a reward value to a positive value. When if the evaluation function $f(r(S'),y(S'),e(S'))$ is equal to the evaluation function $f(r(S),y(S),e(S))$, the reward output unit 1421 sets the value of the reward to zero.

Furthermore, the negative value when the evaluation function $f(r(S'),y(S'),e(S'))$ of the state S' after execution of the action A is larger than the evaluation function $f(r(S),y(S),e(S))$ of the previous state S may increase according to a proportion. That is, the negative value may increase according to the degree of increase in the evaluation function $f(r(S'),y(S'),e(S'))$. In contrast, the positive value when the evaluation function $f(r(S'),y(S'),e(S'))$ of the state S' after execution of the action A is smaller than the evaluation function $f(r(S),y(S),e(S))$ of the previous state S may increase according to a proportion. That is, the positive value may increase according to the degree of decrease in the evaluation function $f(r(S'),y(S'),e(S'))$.

The value function updating unit 1422 updates the value function Q stored in the value function storage unit 144 by performing Q-learning on the basis of the state S, the action A, the state S' when the action A was applied to the state S, and the value of the reward calculated in this manner. The update of the value function Q may be performed by online learning, batch learning, or mini-batch learning. Online learning is a learning method of applying a certain action A to a present state S and updating the value function Q immediately whenever the present state S transitions to a new state S'. Moreover, batch learning is a learning method of applying a certain action A to a present state S and repeated attaining transition from the state S to a new state S', collecting learning data, and updating the value function Q using all the collected learning data. Furthermore, mini-batch learning is a learning method which is intermediate between online learning and batch learning and involves updating the value function Q whenever a certain amount of learning data is collected.

The action information generation unit 1423 selects the action A in the process of Q-learning with respect to the present state S. The action information generation unit 1423 generates action information A and outputs the generated action information A to the action information output unit 143 in order to perform an operation (corresponding to the action A of Q-learning) of correcting the coefficients $\omega$, $\zeta$, and R of the transfer function of the command filter 110 and the coefficients $c_i$ and $d_j$ of the velocity feedforward unit 131 in the process of Q-learning. More specifically, the action information generation unit 1423 adds or subtracts the coefficients $\omega$, $\zeta$, and R of the transfer function of the command filter 110 and the coefficients $c_i$ and $d_j$ of the velocity feedforward unit 131 included in the action A incrementally with respect to the coefficients $\omega$, $\zeta$, and R of the transfer function of the command filter 110 and the coefficients $c_i$ and $d_j$ of the velocity feedforward unit 131 included in the state S, for example.

When the coefficients $\omega$, $\zeta$, and R of the transfer function of the command filter 110 and the coefficients $c_i$ and $d_j$ of the velocity feedforward unit 131 are increased or decreased, the state S transitions to the state S', and a plus reward (a positive reward) is offered in return, the action information generation unit 1423 may select a policy of selecting such an action A' that further decreases the value of the evaluation function f such as incrementally increasing or decreasing the coefficients $\omega$, $\zeta$, and R of the transfer function of the command filter 110 and the coefficients $c_i$ and $d_j$ of the velocity feedforward unit 131 similarly to the previous action as the next action A'.

In contrast, when a minus reward (a negative reward) is offered in return, the action information generation unit 1423 may select a policy of selecting such an action A' that decreases the evaluation function f to be smaller than the previous value such as incrementally decreasing or increasing the coefficients $\omega$, $\zeta$, and R of the transfer function of the command filter 110 and the coefficients $c_i$ and $d_j$ of the velocity feedforward unit 131 contrarily to the previous action as the next action A', for example.

The action information generation unit 1423 may select a policy of selecting the action A' according to a known method such as a greedy method of selecting an action A' having the highest value function Q(S,A) among the values of presently estimated actions A and an ε-greedy method of randomly selecting an action A' with a certain small probability e and selecting an action A' having the highest value function Q(S,A) in other cases.

The action information output unit 143 is a unit that the action information A output from the learning unit 142 to the command filter 110. As described above, the command filter 110 finely adjusts the present state S (that is, the coefficients $\omega$, $\zeta$, and R and the coefficients $c_i$ and $d_j$ set presently) on the basis of the action information to thereby transition to the next state S' (that is, the corrected coefficients of the command filter 110 and the corrected coefficients $c_i$ and $d_j$ of the velocity feedforward unit 131).

The value function storage unit 144 is a storage device that stores the value function Q. The value function Q may be stored as a table (hereinafter referred to as an action value table) for each state S and each action A, for example. The value function Q stored in the value function storage unit 144 is updated by the value function updating unit 1422. Moreover, the value function Q stored in the value function storage unit 144 may be shared with other machine learning units 140. When the value function Q is shared by a plurality of machine learning units 140, since reinforcement learning can be performed in a manner of being distributed to the respective machine learning units 140, it is possible to improve the reinforcement learning efficiency.

The optimization action information output unit 145 generates the action information A (hereinafter referred to as "optimization action information") for causing the command filter 110 and the velocity feedforward unit 131 to perform an operation of maximizing the value function Q(S,A) on the basis of the value function Q updated by the value function updating unit 1422 performing the Q-learning. More specifically, the optimization action information output unit 145 acquires the value function Q stored in the value function storage unit 144. As described above, the value function Q is updated by the value function updating unit 1422 performing the Q-learning. The optimization action information output unit 145 generates the action information on the basis of the value function Q and outputs the generated action information to the command filter 110. The optimization action information includes information that corrects the coefficients $\omega$, $\zeta$, and R of the transfer function of the command filter 110 and the coefficients $c_i$ and $d_j$ of the transfer function of the velocity feedforward unit 131 similarly to the action information that the action information output unit 143 outputs in the process of Q-learning.

In the command filter 110, the coefficients $\omega$, $\zeta$, and R of the transfer function and the coefficients $c_i$ and $d_j$ of the transfer function are corrected on the basis of the action information. With the above-described operations, the machine learning unit 140 can optimize the coefficients $\omega$, $\zeta$, and R of the transfer function of the command filter 110 and the coefficients $c_i$ and $d_j$ of the transfer function of the velocity feedforward unit 131 and operate so that vibration of a machine end is suppressed. As described above, it is possible to simplify adjustment of the parameters of the command filter 110 and the parameters of the velocity feedforward unit 131 using the machine learning unit 140 according to the present embodiment.

Hereinabove, the functional blocks included in the motor controller 100 have been described. In order to realize these functional blocks, the motor controller 100 includes an arithmetic processing unit such as a central processing unit (CPU). The motor controller 100 further includes an auxiliary storage device such as a hard disk drive (HDD) for storing various control programs such as application software or an operating system (OS) and a main storage device such as a random access memory (RAM) for storing data temporarily required when the arithmetic processing device executes a program.

In the motor controller 100, the arithmetic processing device reads an application and an OS from the auxiliary storage device, and develops the read application software and OS in the main storage device to perform arithmetic processing on the basis of the read application software and OS. The arithmetic processing device also controls various types of hardware provided in each device based on the arithmetic result. In this way, the functional blocks of the present embodiment are realized. That is, the present embodiment can be realized by cooperation of hardware and software.

Since the machine learning unit 140 involves a large amount of computation associated with the machine learning, graphics processing units (GPUs) may be mounted on a personal computer and be used for arithmetic processing associated with the machine learning using a technique called general-purpose computing on graphics processing units (GPGPUs). In this way, high speed data processing can be performed. Furthermore, in order for the machine learning unit 140 to perform higher speed data processing, a computer cluster may be built using a plurality of computers equipped with such GPUs, and the plurality of computers included in the computer cluster may perform parallel processing.

Figure 9:
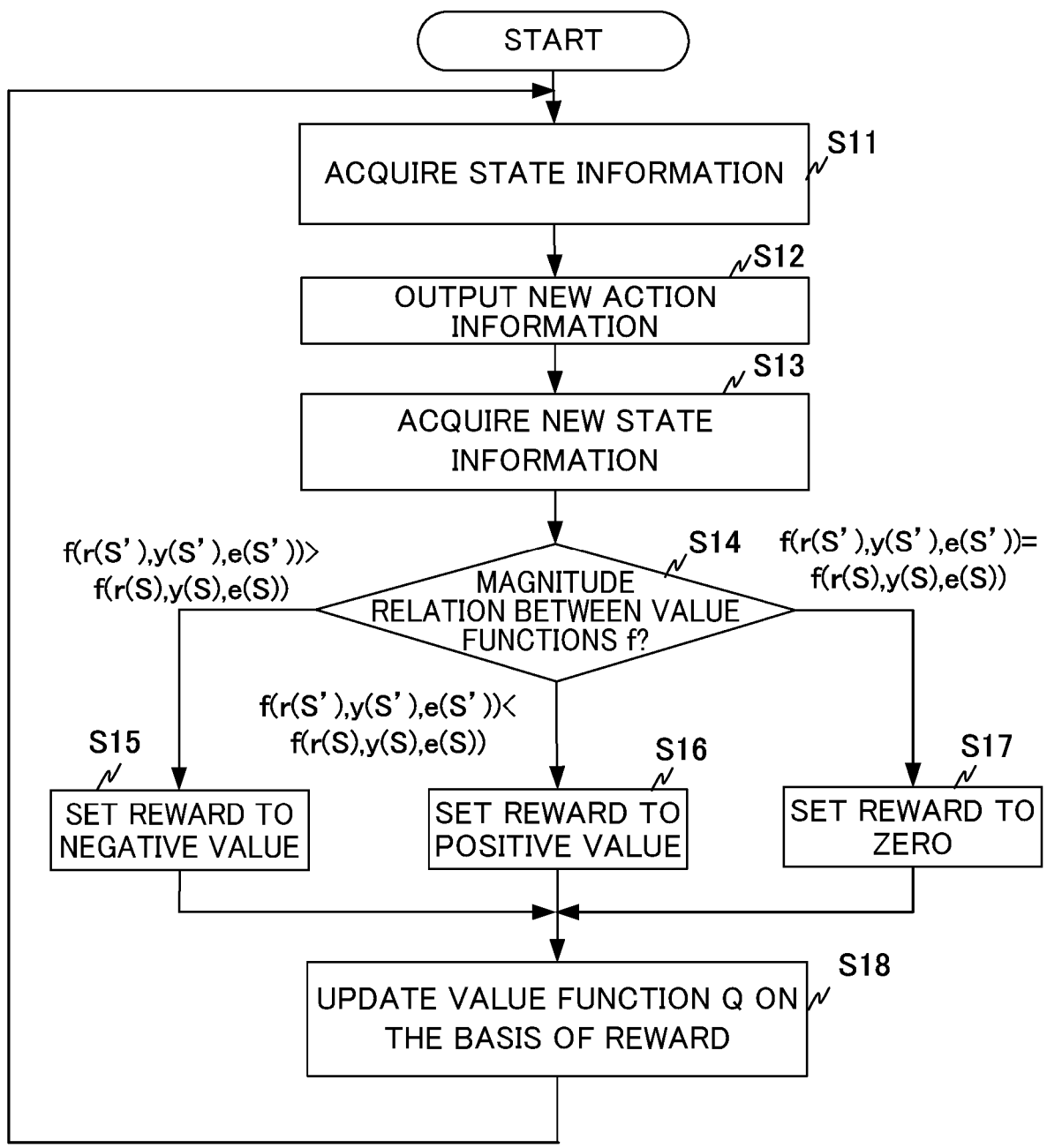
FIG. 9 is a flowchart for describing an operation of a machine learning unit according to an embodiment of the present disclosure.

Next, an operation of the machine learning unit 140 during Q-learning according to the present embodiment will be described with reference to the flowcharts of FIG. 9.

In step S11, the state information acquisition unit 141 acquires the state information S from the motor controller 100. The acquired state information S is output to the value function updating unit 1422 and the action information generation unit 1423. As described above, the state information S is information corresponding to the state of Q-learning and includes the coefficients $\omega$, $\zeta$, and R of the transfer function of the command filter 110 and the coefficients $c_i$ and $d_j$ of the transfer function of the velocity feedforward unit 131 at the time point of step S11. In this way, a position command r(S), a position error e(S), and a measured acceleration y(S) corresponding to a predetermined feed rate and the shape of a moving trajectory when the coefficients of the transfer function of the command filter 110 and the coefficients of the transfer function of the velocity feedforward unit 131 are initial values are acquired.

The position command $r(S_0)$ and the position error $e(S_0)$ in the state $S_0$ at a time point at which Q-learning starts initially and the measured acceleration $y(S_0)$ from the acceleration sensor 300 are obtained by operating the motor controller 100 according to the learning machining program. The position command input to the motor controller 100 is a position command corresponding to a predetermined moving trajectory designated by the machining program (for example, the octagonal moving trajectory illustrated in FIGS. 5 and 6). The position command is input to the command filter 110 and the machine learning unit 140. The initial values of the coefficients $\omega$, $\zeta$, and R of the transfer function of the command filter 110 and the coefficients $c_i$ and $d_j$ of the transfer function of the velocity feedforward unit 131 are generated by a user in advance, and the initial values of the coefficients $\omega$, $\zeta$, and R and the coefficients $c_i$ and $d_j$ are transmitted to the machine learning unit 140. The acceleration sensor 300 outputs the measured acceleration $y(S_0)$ at the respective positions such as the positions C1 to C4 and the positions D1 to D4 of the moving trajectory to the machine learning unit 140. The machine learning unit 140 may extract the position command $r(S_0)$, the position error $e(S_0)$, and the measured acceleration $y(S_0)$ at the respective positions such as the positions C1 to C4 and the positions D1 to D4 of the moving trajectory.

In step S12, the action information generation unit 1423 generates new action information A and outputs the generated new action information A to the command filter 110 via the action information output unit 143. The action information generation unit 1423 outputs the new action information A on the basis of the above-described policy. The motor controller 100 having received the action information A drives a machine tool including the servo motor 127 according to the state S' obtained by correcting the coefficients $\omega$, $\zeta$, and R of the transfer function of the command filter 110 and the coefficients $c_i$ and $d_j$ of the transfer function of the velocity feedforward unit 131 associated with the present state S on the basis of the received action information. As described above, the action information corresponds to the action A in Q-learning.

In step S13, the state information acquisition unit 141 acquires the position command r(S'), the position error e(S'), the measured acceleration y(S') from the acceleration sensor 300, the coefficients $\omega$, $\zeta$, and R of the transfer function from the command filter 110, and the coefficients $c_i$ and $d_j$ of the velocity feedforward unit 131 in the new state S'. In this way, the state information acquisition unit 141 acquires the position command r(S'), the position error e(S'), and the measured acceleration y(S') corresponding to the octagonal moving trajectory (specifically, the positions such as the positions C1 to C4 and the positions D1 to D4 of the moving trajectory) and the coefficients $\omega$, $\zeta$, and R and the coefficients $c_i$ and $d_j$ in the state S'. The acquired state information is output to the reward output unit 1421.

In step S14, the reward output unit 1421 determines a magnitude relation between the evaluation function f(r(S'), y(S'),e(S')) in the state S' and the evaluation function f(r(S), y(S),e(S)) in the state S and sets the reward to a negative value in step S15 when $f(r(S'),y(S'),e(S'))>f(r(S),y(S),e(S))$. When $f(r(S'),y(S'),e(S'))<f(r(S),y(S),e(S))$, the reward output unit 1421 sets the reward to a positive value in step S16. When $f(r(S'),y(S'),e(S'))=f(r(S),y(S),e(S))$, the reward output unit 1421 sets the reward to zero in step S17. The reward output unit 1421 may apply a weighting to the negative and positive reward values. The state S transitions to the state $S_0$ at a time point at which Q-learning starts.

When any one of steps S15, S16, and S17 ends, the value function updating unit 1422 updates the value function Q stored in the value function storage unit 144 on the basis of the value of the reward calculated in any one of the steps in step S18. After that, the flow returns to step S11 again, and the above-described process is repeated, whereby the value function Q settles to an appropriate value. The process may end on condition that the above-described process is repeated a predetermined number of times or for a predetermined period. Although online updating is exemplified in step S18, batch updating or mini-batch updating may be performed instead of the online updating.

In the present embodiment, due to the operations described with reference to FIG. 9, it is possible to obtain an appropriate value function for adjustment of the coefficients $\omega$, $\zeta$, and R of the transfer function of the command filter 110 and the coefficients $c_i$ and $d_j$ of the transfer function of the velocity feedforward unit 131 and to simplify optimization of the coefficients $\omega$, $\zeta$, and R of the transfer function of the command filter 110 and the coefficients $c_i$ and $d_j$ of the transfer function of the velocity feedforward unit 131 using the machine learning unit 140. Next, an operation during generation of the optimization action information by the optimization action information output unit 145 will be described with reference to the flowchart of FIG. 10. First, in step S21, the optimization action information output unit 145 acquires the value function Q stored in the value function storage unit 144. As described above, the value function Q is updated by the value function updating unit 1422 performing the Q-learning.

In step S22, the optimization action information output unit 145 generates the optimization action information on the basis of the value function Q and outputs the generated optimization action information to the command filter 110.

Figure 10:
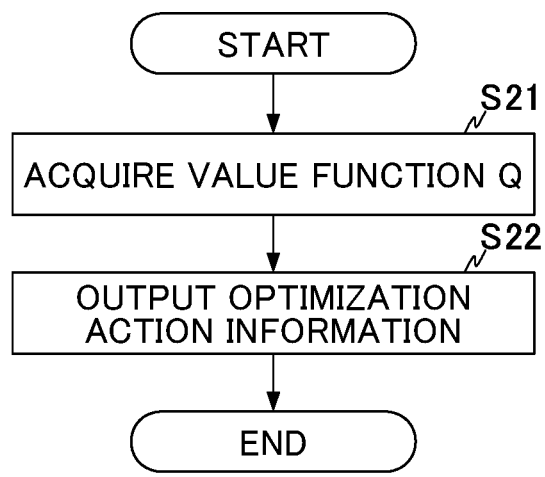
FIG. 10 is a flowchart for describing an operation of an optimization action information output unit of the machine learning unit according to an embodiment of the present disclosure.

Moreover, in the present embodiment, due to the operations described with reference to FIG. 10, it is possible to generate the optimization action information on the basis of the value function Q obtained by the learning of the machine learning unit 140, simplify adjustment of the coefficients $\omega$, $\zeta$, and R of the transfer function of the command filter 110 and the coefficients $c_i$ and $d_j$ of the transfer function of the velocity feedforward unit 131 set presently on the basis of the optimization action information, suppress a trajectory error and vibration of a machine end, and improve the quality of a machining surface of a work. Since the external measuring instrument is disposed outside the motor controller, it is possible to detach the external measuring instrument after machine learning is performed and to reduce the cost and improve reliability.

The servo control unit of the motor controller described above and the components included in the machine learning unit may be realized by hardware, software or a combination thereof. The servo control method performed by cooperation of the components included in the motor controller described above also may be realized by hardware, software, or a combination thereof. Here, being realized by software means being realized when a computer reads and executes a program.

The programs can be stored on any of various types of non-transitory computer readable media and be provided to a computer. The non-transitory computer readable media include various types of tangible storage media. Examples of the non-transitory computer readable media include a magnetic recording medium (for example a flexible disk and a hard disk drive), a magneto-optical recording medium (for example a magneto-optical disk), a CD-ROM (Read Only Memory), a CD-R, a CD-R/W, a semiconductor memory (for example a mask ROM, a PROM (Programmable ROM), an EPROM (Erasable PROM), a flash ROM, and a RAM (Random Access Memory)). Moreover, the programs may be supplied to a computer via various types of transitory computer readable media.

The above-described embodiment is a preferred embodiment of the present invention. However, the scope of the present invention is not limited to the embodiment only but the present invention can be embodied in various modifications without departing from the spirit of the present invention.

In the above-described embodiment, although a case in which an acceleration sensor is used as an external measuring instrument and the measurement information is acceleration information has been described, position information and velocity information which serve as measurement information and which may be double-differentiated or differentiated to obtain acceleration information using a position sensor or a velocity sensor as the external measuring instrument.

In the above-described embodiment, although an example in which the coefficients $\omega$, $\zeta$, and R of the transfer function of the command filter 110 and the coefficients $c_i$ and $d_j$ of the transfer function of the velocity feedforward unit 131 are learned simultaneously has been described, the machine learning unit 140 may learn and optimize one of the coefficients $\omega$, $\zeta$, and R and the coefficients $c_i$ and $d_j$ and then optimize learning of the other coefficients. Moreover, the coefficients $a_i$ and $b_j$ of the transfer function of the position feedforward unit 130 may be learned together.

Figure 11:
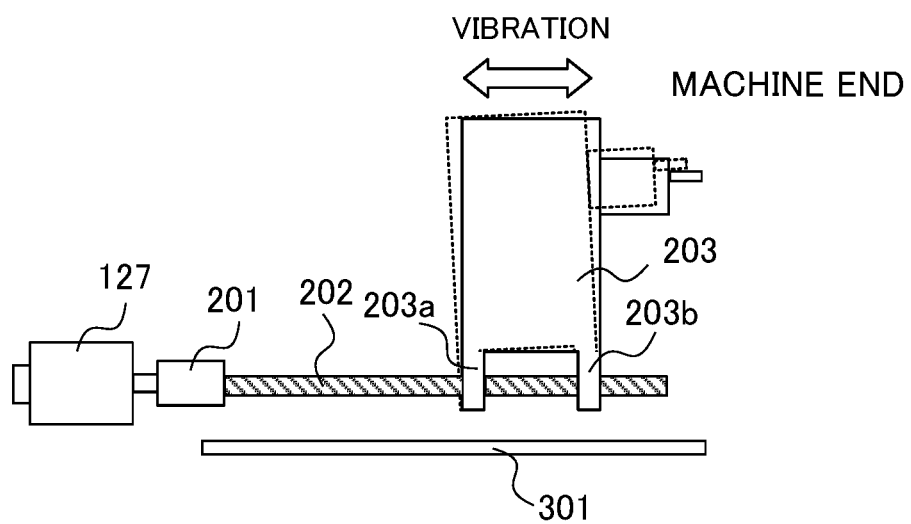
FIG. 11 is an explanatory diagram illustrating a state in which a scale is attached to a machine body.

When a position sensor is used as an external measuring instrument, a scale (a linear scale) is attached to a machine body 203 as an external measuring instrument. FIG. 11 is an explanatory diagram illustrating a state in which a scale is attached to the machine body 203. In this case, a scale 301 detects the position of the machine body 203 and outputs position information to the machine learning unit 140. The machine learning unit 140 can obtain acceleration information by double-differentiating the obtained position information.

Figure 12:
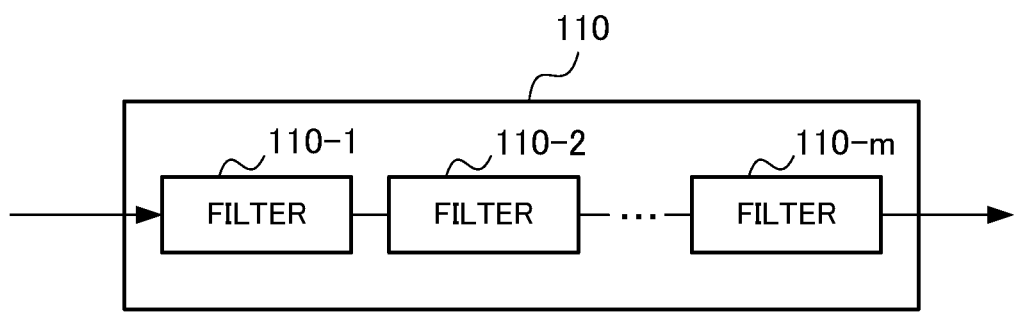
FIG. 12 is a block diagram illustrating an example in which a filter is formed by connecting a plurality of filters directly.

In the above-described embodiment, although a case in which the machine tool 200 has one resonance point has been described, the machine tool 200 may have a plurality of resonance points. When the machine tool 200 has a plurality of resonance points, a plurality of filters may be provided so as to correspond to the respective resonance points and be connected in series to form the command filter 110 whereby all resonances can be attenuated. FIG. 12 is a block diagram illustrating an example in which a plurality of filters are connected in series to form a filter. In FIG. 12, when there are m (m is a natural number of 2 or more) resonance points, the command filter 110 is formed by connecting m command filters 110-1 to 110-$m$ in series. Optimal values for attenuating resonance points are calculated sequentially by machine learning with respect to the coefficients $\omega$, $\zeta$, and R of the m command filters 110-1 to 110-$m$.

The control system may have the following configuration other than the configuration illustrated in FIG. 1.

<Modification in which Machine Learning Device is Provided Outside Motor Control Device>

Figure 13:
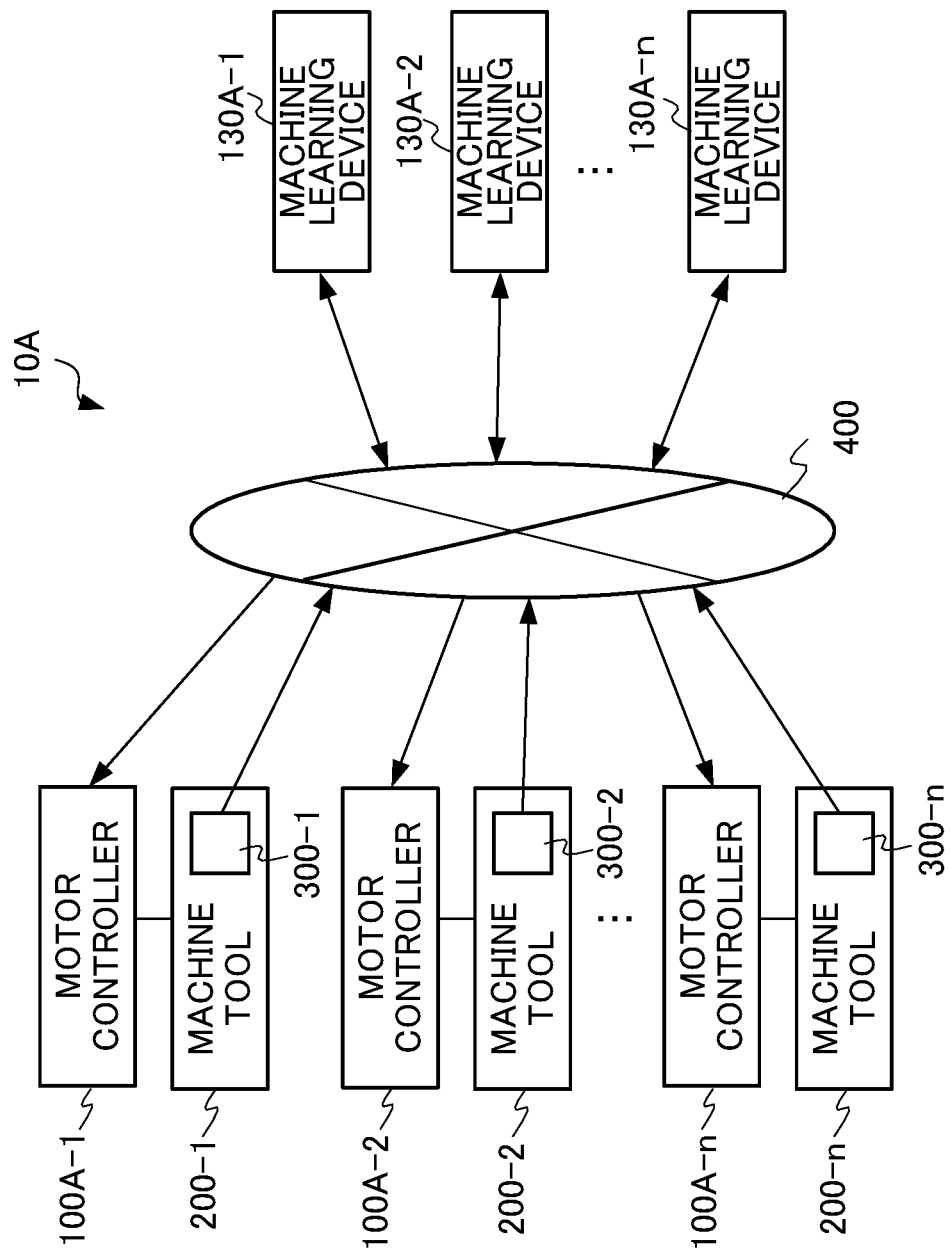
FIG. 13 is a block diagram illustrating another configuration example of a control system.

FIG. 13 is a block diagram illustrating another configuration example of the control system. A difference between a control system 10A illustrated in FIG. 13 and the control system 10 illustrated in FIG. 1 is that n (n is a natural number of 2 or more) motor controllers 100A-1 to 100A-n and n machine tools 200-1 to 200-*n* having acceleration sensors 300-1 to 300-*n* attached thereto are connected to machine learning devices 140A-1 to 140A-n via a network 400. The motor controllers 100A-1 to 100A-n have the same configuration as the motor controller 100 illustrated in FIG. 1 except that the motor controller does not include a machine learning unit. The machine learning devices 140A-1 to 140A-n have the same configuration as the machine learning unit 140 illustrated in FIG. 7.

Here, the motor controller 100A-1, the acceleration sensor 300-1 and the machine learning device 140A-1 are communicably connected as a one-to-one correlation. The motor controllers 100A-2 to 100A-n, the acceleration sensors 300-1 to 300-*n*, and the machine learning devices 140A-2 to 140A-n are connected similarly to the motor controller 100A-1, the machine tool 200-1, and the machine learning device 140A-1. Although n pairs of the motor controllers 100A-1 to 100A-n, the acceleration sensors 300-1 to 300-*n*, and the machine learning devices 140A-1 to 140A-n are connected via the network 400 in FIG. 13, the n pairs of the motor controllers 100A-1 to 100A-n, the acceleration sensors 300-1 to 300-*n*, and the machine learning devices 140A-1 to 140A-n may be connected directly such that the motor controller, the machine tool, and the machine learning device of each pair are connected directly by a connection interface. A plurality of n pairs of the machine tools 200-1 to 200-*n* to which the motor controllers 100A-1 to 100A-n and the acceleration sensors 300-1 to 300-*n* are attached and the machine learning devices 140A-1 to 140A-n may be provided in the same plant, for example, and may be provided in different plants.

The network 400 is a local area network (LAN) constructed in a plant, the Internet, a public telephone network, a direct connection via a connection interface, or a combination thereof, for example. A specific communication scheme of the network 400, whether the network uses a cable connection or a wireless connection, and the like are not particularly limited.

<Freedom in System Configuration>

In the embodiment described above, although the motor controllers 100A-1 to 100A-n, the acceleration sensors 300-1 to 300-*n*, and the machine learning devices 140A-1 to 140A-n are communicably connected as a one-to-one correlation, for example, one machine learning device may be communicably connected to a plurality of motor controllers and a plurality of acceleration sensors via the network 400 and the machine learning of the respective motor controllers and the respective machine tools may be performed. However, in this case, a distributed processing system may be adopted, in which respective functions of one machine learning device are distributed to a plurality of servers as appropriate. The functions of one machine learning device may be realized by utilizing a virtual server function or the like on a cloud.

When there are n machine learning devices 140A-1 to 140A-n corresponding to n motor controllers 100A-1 to 100A-n and n machine tools 200-1 to 200-*n*, respectively, of the same type name, the same specification, or the same series, the machine learning devices 140A-1 to 140A-n may be configured to share learning results in the machine learning devices 140A-1 to 140A-n. By doing so, a more optimal model can be constructed.

The machine learning device, the control system, and the machine learning method according to the present disclosure can take various embodiments having the following configuration including the above-described embodiment.

(1) An aspect of the present disclosure is a machine learning device 140 that performs machine learning of optimizing first coefficients of a filter 110 provided in a motor controller 100 that controls a motor 127 and second coefficients of a velocity feedforward unit 131 on the basis of an evaluation function which is a function of measurement information after acceleration and deceleration by an external measuring instrument provided outside the motor controller 100, a position command input to the motor controller 100, and a position error which is a difference between the position command value and feedback position detection value from a detector of the servo control unit 120. According to this machine learning device 140, it is possible to suppress vibration of a machine end and an error of a moving trajectory by machine-learning the first coefficients that determine the characteristics of the filter 110 and the second coefficients of the velocity feedforward unit 131. Moreover, since the external measuring instrument is disposed outside the motor controller 100, it is possible to detach the external measuring instrument after machine learning is performed and to reduce the cost and improve reliability.

(2) In the machine learning device 140 according to (1), the measurement information of the external measuring instrument includes at least one of a position, a velocity, and an acceleration.

(3) In the machine learning device 140 according to (1) or (2), the servo control unit 120 includes at least one of a position feedback loop and a velocity feedback loop, and the filter 110 is provided outside the position feedback loop or the velocity feedback loop. According to this machine learning device 140, it is possible to suppress vibration outside a control loop (a position feedback loop or a velocity feedback loop) of the servo control unit 120.

(4) In the machine learning device 140 according to (1) or (2), the motor control unit 120 has a feedback loop and the measurement information of the external measuring instrument is not used for feedback control of the feedback loop. According to this machine learning device 140, the external measuring instrument can be detached. As a result, it is possible to reduce the cost of the machine tool and the like and improve reliability.

(5) In the machine learning device 140 according to any one of (1) to (4), the external measuring instrument is detached after adjustment of the filter 110 by machine learning. According to this machine learning device 140, the external measuring instrument can be detached after adjustment of the filter 110 is performed, and as a result, it is possible to reduce the cost of the machine tool and the like and improve reliability.

(6) In the machine learning device 140 according to any one of (1) to (5), the filter 110 is an IIR filter of the second order or higher. According to this machine learning device 140, since the number of taps can be decreased as compared to FIR filters, it is possible to obtain a faster filter 110.

(7) The machine learning device 140 according to any one of (1) to (6), further including: a state information acquisition unit 141 that acquires state information including the measurement information, the position command, the position error, the first coefficients of the filter 110, and the second coefficients of the velocity feedforward unit 131;

an action information output unit 143 that outputs action information including adjustment information of the first and second coefficients included in the state information to the filter 110 and the velocity feedforward unit 131;

a reward output unit 1421 that outputs a reward value of reinforcement learning using a value function which is a function of the measurement information, the position command, and the position error; and a value function updating unit 144 that updates an action value function on the basis of the reward value output by the reward output unit, the state information, and the action information.

(8) The machine learning device 140 according to (7), further including: an optimization action information output unit 145 that outputs adjustment information of the first and second coefficients on the basis of the value function updated by the value function updating unit 144.

(9) A control system 10 including: a motor controller 100 that includes the machine learning device 140 according to any one of (1) to (8), a motor 127, a servo control unit 120 that includes a velocity feedforward unit 131, and a filter 110, the motor controller controlling the motor 127; and an external measuring instrument provided outside the motor controller 100.

(10) A machine learning method of a machine learning device 140, including: acquiring first coefficients of a filter 110 provided in a motor controller 100 that controls a motor 127, second coefficients of a velocity feedforward unit 131, measurement information after acceleration and deceleration by an external measuring instrument provided outside the motor controller 100, a position command input to the motor controller 100, and a position error which is a difference between the position command value and feedback position detection value; and performing machine learning of optimizing the first coefficients and the second coefficients on the basis of an evaluation function which is a function of the measurement information, the position command, and the position error. According to this machine learning method, it is possible to suppress vibration of a machine end and an error of a moving trajectory by machine-learning the first coefficients that determine the characteristics of the filter 110 and the second coefficients of the velocity feedforward unit 131. Moreover, since the external measuring instrument is disposed outside the motor controller 100, it is possible to detach the external measuring instrument after machine learning is performed and to reduce the cost and improve reliability.

EXPLANATION OF REFERENCE NUMERALS

10, 10A: Control system
100, 100A-1 to 100A-n: Motor controller
110: Command filter
120: Servo control unit
121: Subtractor
122: Position control unit
123: Adder
124: Subtractor
125: Velocity control unit
126: Adder
127: Servo motor
128: Rotary encoder
129: Integrator
130: Position feedforward unit
131: Velocity feedforward unit
140: Machine learning unit
140A-1 to 140A-n: Machine learning device
141: State information acquisition unit
142: Learning unit
143: Action information output unit
144: Value function storage unit
145: Optimization action information output unit
200, 200-1 to 200-n: Machine tool
300: Acceleration sensor
400: Network

What is claimed is:

1. A machine learning device that performs machine learning of optimizing first coefficients of a filter provided in a motor controller that controls a motor and second coefficients of a velocity feedforward unit of a servo control unit provided in the motor controller on the basis of an evaluation function which is a function of measurement information after acceleration and deceleration by an external measuring instrument provided outside the motor controller, a position command input to the motor controller, and a position error which is a difference between the position command value and feedback position detection value from a detector of the servo control unit.

2. The machine learning device according to claim 1, wherein the measurement information of the external measuring instrument includes at least one of a position, a velocity, and an acceleration.

3. The machine learning device according to claim 1, wherein the servo control unit includes at least one of a position feedback loop and a velocity feedback loop, and the filter is provided outside the position feedback loop or the velocity feedback loop.

4. The machine learning device according to claim 1, wherein the motor control unit has a feedback loop and the measurement information of the external measuring instrument is not used for feedback control of the feedback loop.

5. The machine learning device according to claim 1, wherein the external measuring instrument is detached after adjustment of the filter by machine learning.

6. The machine learning device according to claim 1, wherein the filter is an IIR filter of the second order or higher.

7. The machine learning device according to claim 1, further comprising: a state information acquisition unit that acquires state information including the measurement information, the position command, the position error, the first coefficients of the filter, and the second coefficients of the velocity feedforward unit;

an action information output unit that outputs action information including adjustment information of the first and second coefficients included in the state information to the filter and the velocity feedforward unit;

a reward output unit that outputs a reward value of reinforcement learning using a value function which is a function of the measurement information, the position command, and the position error; and a value function updating unit that updates an action value function on the basis of the reward value output by the reward output unit, the state information, and the action information.

8. The machine learning device according to claim 7, further comprising: an optimization action information output unit that outputs adjustment information of the first and second coefficients on the basis of the value function updated by the value function updating unit.

9. A control system comprising: a motor controller that includes the machine learning device according to claim 1, a motor, a servo control unit that includes a velocity feedforward unit, and a filter, the motor controller controlling the motor; and an external measuring instrument provided outside the motor controller.

10. A machine learning method of a machine learning device, comprising: acquiring first coefficients of a filter provided in a motor controller that controls a motor, second coefficients of a velocity feedforward unit, measurement information after acceleration and deceleration by an external measuring instrument provided outside the motor controller, a position command input to the motor controller, and a position error which is a difference between the position command value and feedback position detection value; and performing machine learning of optimizing the first coefficients and the second coefficients on the basis of an evaluation function which is a function of the measurement information, the position command, and the position error.

* * * * *